US012266839B2

(12) United States Patent
Hong et al.

(10) Patent No.: US 12,266,839 B2
(45) Date of Patent: Apr. 1, 2025

(54) RADIO FREQUENCY PASS-BAND FILTER

(71) Applicant: European Space Agency, Noordwijk (NL)

(72) Inventors: Jiasheng Hong, Edinburgh (GB); Jia Ni, Edinburgh (GB); Petronilo Martin-Iglesias, Noordwijk (NL)

(73) Assignee: European Space Agency, Paris (FR)

( * ) Notice: Subject to any disclaimer, the term of this patent is extended or adjusted under 35 U.S.C. 154(b) by 0 days.

(21) Appl. No.: 17/277,051

(22) PCT Filed: Sep. 17, 2018

(86) PCT No.: PCT/EP2018/075104
§ 371 (c)(1),
(2) Date: Mar. 17, 2021

(87) PCT Pub. No.: WO2020/057722
PCT Pub. Date: Mar. 26, 2020

(65) Prior Publication Data
US 2021/0376436 A1 Dec. 2, 2021

(51) Int. Cl.
*H01P 1/203* (2006.01)
*H01Q 1/38* (2006.01)

(52) U.S. Cl.
CPC ........... *H01P 1/20372* (2013.01); *H01Q 1/38* (2013.01)

(58) Field of Classification Search
CPC .............................. H01P 1/20372; H01Q 1/38
See application file for complete search history.

(56) References Cited

FOREIGN PATENT DOCUMENTS

EP 1296406 A1 * 3/2003 .......... H01P 1/20363

OTHER PUBLICATIONS

Williams, et al., "Predistortion Techniques for Multicouple Resonator Filters", IEEE Transaction On Microwave Theory and Techniques, vol. MTT-33, No. 5, May 1985, pp. 402-407.
Yu, et al., "Predistortion Technique for Cross-Coupled Filters and Its Application to Satellite Communication Systems", IEEE Transaction on Microwave Theory and Techniques, vol. 51, No. 12, Dec. 2003, pp. 2505-2515.
Fathelbab, et al., "Synthesis of Lossy Reflection-Mode Prototype Networks With Symmetrical and Asymmetrical Characteristics", IEE Proceedings on Microw. Antennas Propag., vol. 146, No. 2, Apr. 1999, pp. 97-104.
Hunter, et al., "Passive Microwave Receive Filter Networks Using Low-Q Resonators", IEEE Microwave Magazine, Sep. 2005, pp. 46-53.
Yu, et al., "Novel Adaptive Predistortion Technique for Cross Coupled Filters", IEEE MTT-S Digest, 2003, pp. 929-932.
Rhodes, et al., "Synthesis of Reflection-Mode Prototype Networks With Dissipative Circuit Elements", IEE Proceedings on Microw. Antennas Propag., vol. 144, No. 6, Dec. 1997, pp. 437-442.
(Continued)

*Primary Examiner* — Andrea Lindgren Baltzell
*Assistant Examiner* — Kimberly E Glenn
(74) *Attorney, Agent, or Firm* — DINSMORE & SHOHL LLP

(57) ABSTRACT

A radio frequency passband filter is provided comprising a network of half-wavelength planar resonators. At least one of the half-wavelength planar resonators includes a resistor shunted to ground to flatten response in the passband.

16 Claims, 17 Drawing Sheets

(56) References Cited

OTHER PUBLICATIONS

Fathelbab, et al., "Synthesis of Predistorted Reflection-Mode Hybrid Prototype Networks With Symmetrical and Assymetrical Characteristics", International Journal of Circuit Theory and Applications, 2001, pp. 251-266.
Guyette, et al., "The Design of Microwave Bandpass Filters Using Resonators With Nonuniform Q", IEEE Transactions on Microwave Theory and Techniques, vol. 54, No. 11, Nov. 2006, pp. 3914-3922.

* cited by examiner

RADIO FREQUENCY PASS-BAND FILTER

CROSS-REFERENCE TO RELATED APPLICATIONS

This application is a national stage application, filed under 35 U.S.C. § 371, of International Patent Application No. PCT/EP2018/075104, filed on Sep. 17, 2018, which is incorporated by reference herein in its entirety.

FIELD

The present disclosure relates to a radio frequency pass-band filter for use, for example, in a satellite as part of a microwave communications system.

BACKGROUND

A simple filter can be considered as a two-terminal device having an input and an output, with the input and output related by a filter transfer function. One type of filter is a passband filter, which in the ideal case for a frequency f provides a transmitted output O(f) given by O(f)=I(f) for $F_L \leq f \leq F_U$, and O(f)=0 otherwise, where I(f) is the input signal and $F_L$ and $F_U$ are the lower and upper frequency limits respectively of the filter passband. A further property of an ideal filter is that the reflected signal R(f)=0 (the reflected signal R(f) travels backwards from the input terminal, in contrast to O(f), which travels onwards from the output terminal). Note that the input signal I(f) is generally time-varying, and hence the output signal O(f) and any reflected signal R(f) will likewise be time-varying.

Practical filter implementations fall short of the ideal case in various ways. For example, the edges of the passband typically have a steep fall-off, but are not infinitely sharp; the transmission in the passband is not unity, at least not across the whole passband; and/or there is not complete rejection outside the passband. Practical filter implementations are generally a compromise between these various filter properties or parameters, and any given filter implementation may give more priority to certain properties than others, according to the requirements of the intended application.

Microwave passive filters, which are widely used in many wireless communication systems, may be formed from a network or configuration of one or more resonators. A significant parameter for describing such a resonator is its Quality (Q) factor (more particularly, the Unloaded Quality Factor, sometimes denoted $Q_U$), which is defined as the ratio of the stored energy with the resonator divided by the amount of energy lost per cycle. A high Q factor indicates a relatively low level of damping—if the resonator is activated (equivalent to striking a bell), the resonator will continue to resonate/oscillate for a long time. Conversely, a low Q factor indicates a relatively high level of damping, such that oscillations of such a resonator will die out much more quickly. A high Q factor also results in a tall but narrow resonance peak, whereas a low Q factor results in a shorter but broader resonance peak (where narrow/broad refers to frequency, and tall/short refers to signal gain).

For certain filters, we can write O(f)=T(f)I(f), where T(f) is a (complex) transmission parameter that represents a simple (multiplicative) form of transfer function. Although T(f)=1 for the ideal case mentioned above, the use of resonators with finite values of Q factor for a filter typically produces two major kinds of undesired features in the filter characteristics:

(i) a lack of flatness across the passband of the transmission parameter—i.e. T(f) varies with frequency; and (ii) an increase of the insertion loss level—i.e. T(f) falls below unity.

It is feasible to compensate for the increase in insertion loss (feature (ii)) by subsequent amplification, but compensating for the lack of flatness across the passband (feature (i)) tends to be more difficult.

Many filters are designed using a well-known classical synthesis procedure, which generates a lossless (purely reactive—no dissipation effect) network that defines (i) the resonant frequency of the resonators forming the filter, and (ii) how the resonators are coupled [1]. However, as noted above, the finite value of the Q factor representing, for example, material losses, leads to a practical filter implementation departing from the model of classical synthesis.

FIG. 1 is a schematic representation of an example filter, in which the open circles represent the input (left) and output (right) terminals of the filter, and the solid circles represent a network or configuration of resonators used to form the filter. As noted above, for physical resonators with finite Q, there is some dissipation or energy loss within the resonators. In contrast, conventional filter synthesis methods and models assume lossless resonators. Consequently, although the modelled output from such a filter synthesis might provide a flat passband, the actual outcome, when allowing for dissipation, may be degraded in this respect.

One known class of techniques for addressing the lack of passband flatness in such a filter is known as predistortion. The basic idea of predistortion involves using a priori information of the finite Q of the resonators to alter the lossless transfer function in such a way that the ideal response is recovered when dissipation is included. Selectivity improvement is achieved by reflecting power in the passband, but as a result the return loss is severely degraded—i.e. the reflected signal, R(f), becomes stronger. This may lead to the use of isolators (not shown in FIG. 1) to prevent the reflected signal from adversely affecting the operation of other components of the system. However, these additional isolators increase the cost and complexity of the filter (and overall system), and may also make tuning more difficult. In addition, such predistortion may increase the insertion loss substantially (e.g. by several dBs), which again may degrade the overall operation of the system.

FIG. 2 shows the transmission parameter (full line) and reflected signal strength (dashed line) for various (modelled) filter implementations using predistortion. In particular, the red lines 10*a* (solid), 10*b* (dashed) correspond to a standard (lossless) synthesis (SS) using a resonator Q-factor of 6000; the blue 12*a* (solid), 12*b* (dashed) and black lines 14*a* (solid), 14*b* (dashed) correspond to two different implementations using full predistortion and a resonator Q-factor of 1600 (FPD1) and 3000 (FPD2) respectively; the pink lines 16*a* (solid) 16*b* (dashed) correspond to using partial predistortion (PPD) and a resonator Q-factor of 3000, whereby the pre-distortion is used to emulate a response with an effective resonator Q (Qeff) of 6000 (achieved by moving the poles of the transfer function); and the green lines 18*a* (solid), 18*b* (dashed) correspond to using adaptive predistortion (APD) and a resonator Q-factor of 3000, which again involves moving the poles of the transfer function.

FIG. 2 shows that the filter implementations can be ranked in order of increasing insertion loss as SS, PPD, APD, FPD2 and FPD1, with the insertion loss for FDP1 (blue) being nearly 10 dB worse than the insertion loss for SS (red); in all cases, the transmission parameter is substantially flat across the passband (as desired). As a corollary of the increased insertion loss, there is a stronger reflected signal (within the passband), with the various filter implementations ranked in the same order as for insertion loss, i.e. SS, PPD, APD, FPD2 and FPD1, with SS having the smallest reflected signal (return loss), and FPD1 having the greatest reflected signal (return loss).

An alternative approach to predistortion is known as lossy synthesis. FIG. 3 shows an example of the lossy synthesis approach for a filter having the same configuration of resonators as shown in FIG. 1. However, the filter of FIG. 3 includes some resistive (i.e. lossy) cross-couplings between the different resonators. Overall, an incoming signal can be transmitted, reflected and/or absorbed. Whereas predistortion in effect increases reflection to control or modify transmission, lossy synthesis uses both reflection and absorption for this purpose. The lossy synthesis may be implemented based on existing losses and/or by adding new losses (such as the cross-coupling resistors shown in FIG. 3) to improve the filter performance. One consequence of lossy synthesis is that it may give rise to networks with resistive elements among purely reactive components, which can result in nonuniform dissipation distribution along the network (filter configuration).

FIG. 4 shows the transmission parameter (full line) and reflected signal strength (dashed line) for various (modelled) filter implementations using lossy synthesis. In particular, the (plain) red lines 20 correspond to a standard (lossless) synthesis (SS) using a resonator Q-factor of 6000, and there are two implementations using lossy synthesis, both shown with a line incorporating dots, firstly a lossy synthesis (blue line 22) using a resonator Q-factor of 6700 (LS1), and secondly a lossy synthesis (red line 24) using a resonator Q-factor of 3500 (LS2).

Looking at FIG. 4, it can be seen that LS1 and LS2 both have a similar insertion loss of about 3 dB, comparable to the better predistortion implementations shown in FIG. 2. In all cases, the transmission parameter is substantially flat across the passband (as desired, and as was also achieved by predistortion). The maximum return loss for LS1 and LS2 is about 20 dB, which is significantly smaller than the maximum return loss shown for predistortion (which was approximately in the range 5-15 dB, as shown in FIG. 2). It will be appreciated that this improvement (reduction in return loss) follows from the greater absorption of the lossy synthesis (compared to predistortion). In other words, the lossy synthesis is able to selectively remove energy from the transmitted signal, which can then be at least partly absorbed (rather than necessarily reflected, as for the predistortion shown in FIGS. 1 and 2).

On the other hand, lossy synthesis can make physical realization of a filter more complex, in particular in relation to the additional cross-couplings. Furthermore, the size of a lossy filter implementation will also tend to increase, again because of the additional cross-couplings, which can be particularly disadvantageous in certain applications, for example, for space or hand-held communications systems.

Accordingly, both predistortion and lossy synthesis have certain limitations or drawbacks for the implementation of radio-frequency filters.

(Further details about predistorted and lossy filters can be found in: "Comparison of lossy filters and predistorted filters using novel software" by Padilla et al, 2010 IEEE MTT-S International Microwave Symposium, as well in various citations listed in the References section at the end of the description).

SUMMARY

In one aspect, a radio frequency passband filter is provided comprising a network of half-wavelength planar resonators. At least one of the half-wavelength planar resonators includes a resistor shunted to ground to flatten response in the passband.

BRIEF DESCRIPTION OF THE DRAWINGS

Various implementations of the disclosure will now be described in detail by way of example only with reference to the following drawings.

DETAILED DESCRIPTION

Figure 5:
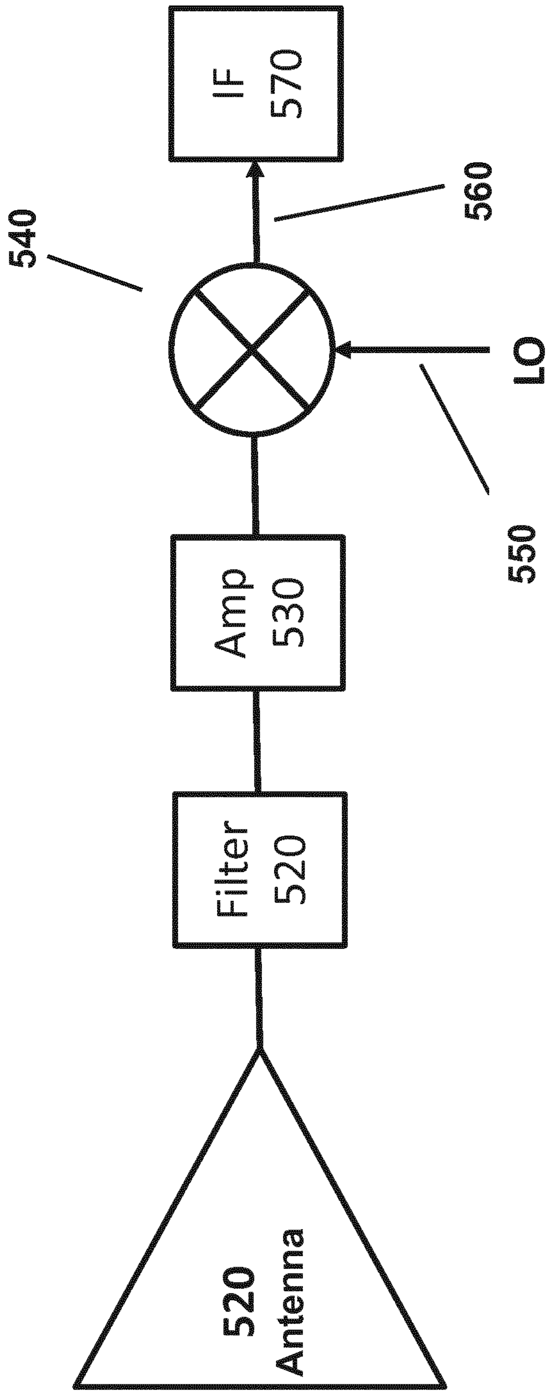
FIG. 5 is a (simplified) schematic diagram of part of a radio (microwave) communications system including an example of a radio frequency pass-band filter, according to one or more embodiments shown and described herein.

FIG. 5 is a schematic diagram of a portion of a radio (microwave) communications system including a radio frequency pass-band filter in accordance with the present disclosure. Such a radio communications system may be used, for example, in a spacecraft to support communications with the earth. It will be appreciated that FIG. 5 is given as an example of the implementation and use of such a radio frequency pass-band filter, and many other implementations and uses will be apparent to the skilled person.

The radio communications system in FIG. 5 includes an antenna 510, which is typically used to receive a microwave signal having a frequency, for example, of the order of 10 GHZ. The received signal is passed from the antenna through a filter 520 and a low noise amplifier 530 to a mixer 540. The mixer 540 also receives a signal 550 from a local oscillator, which is combined with the incoming signal received at antenna 510 to down-convert the latter to an intermediate frequency (IF). For example, if the local oscillator signal 550 has a frequency of 9 GHz, the IF signal 560 output from the mixer 540 has a frequency of 1 GHz. However, because the mixing is a non-linear process, the IF signal output from mixer 540 contains multiple additional components of various frequencies. Consequently, the IF signal 560 is fed through an IF filter 570 to retain the single component of interest (at 1 GHz) and to remove the other components.

The IF filter 570 comprises (is) a radio frequency pass-band filter as described herein. For example, the IF filter 570 may provide a flat pass-band centered on 1 GHz. After the IF signal 560 passes through the IF filter 570, the IF signal undergoes additional processing to recover the data encoded (e.g. modulated) into the IF signal. (This additional processing is well-known to the skilled person, and will not be described further herein).

The IF filter 570 may be subject to specifications in terms of the maximum amount of signal that can be reflected back to the mixer 540 (since any such reflected signal may impact e.g. degrade the operation of the mixer 540). More generally, reducing or minimizing the signal reflected from the IF filter 570 helps to provide better isolation between the various components of the communications system, which makes it easier, for example, to substitute or modify an individual component without so much concern about the impact of such a substitution on the other components in the system).

It will be appreciated that the frequencies mentioned above for the received signal and for the local oscillator signal 550 are provided by way of example only, and may be set to any suitable value. Likewise, the radio frequency pass-band filter as described herein may be used in any appropriate context, and is not limited to use in an intermediate frequency filter (nor to use in a satellite communications system).

Figure 6:
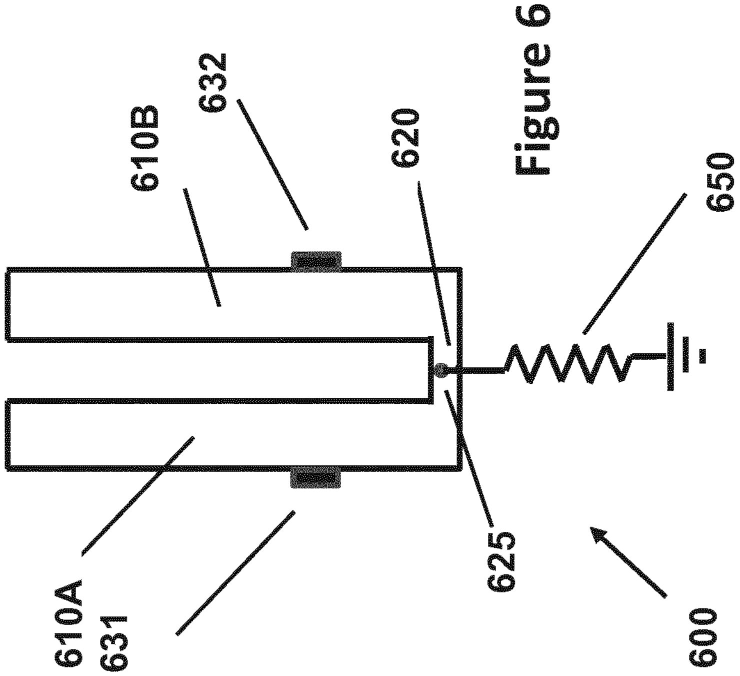
FIG. 6 is a schematic diagram of an example of a resonator for use in a radio frequency pass-band filter, according to one or more embodiments shown and described herein.

FIG. 6 is a schematic diagram of a planar resonator 600 such as may be used in the IF filter 570 shown in FIG. 5. The resonator 600 comprises two parallel conductive strips 610A, 610B joined at one end by a narrower conductive channel 620 to form an approximately U-shaped resonator. The resonator 600 is sometimes referred to as a hairpin resonator in view of this U-shaped configuration of strips (it will be appreciated that while for ease of explanation, resonator 600 is described as having multiple strips 610A, 610B and 620, in terms of physical implementation, the resonator will generally be formed integrally as a single strip having various changes in width and direction as shown in FIG. 6). An input 631 is provided to the conductor strip 610A and an output 632 is taken from the opposing conductor strip 610B.

The resonator 600 is designed (dimensioned etc.) to act as a half-wavelength resonator, in other words, the path length from the top end of conductor strip 610A (i.e. the end furthest from channel 620) to the top end of conductor strip 610B (again the end furthest from channel 620) corresponds to half a wavelength for microwaves of the resonant frequency. In addition, for an input at the resonant frequency, there is a virtual ground 635 at the midpoint of the channel strip 620, in other words, due to symmetry, this location stays at zero (ground) voltage. Note that this virtual ground 635 exists when the resonator 600 is used in standalone form; however, in general the intermediate filter 570 will include multiple resonators which are electro-magnetically coupled together, and this coupling typically causes the field distribution in each individual resonator to depart from the standalone form of the field distribution).

FIG. 6 further shows that the channel 620 has a physical connection to ground provided by resistor 650. The resistor 650 is depicted schematically in FIG. 6 as extending in the plane of the strip pattern 610A, 610B, 620 of the planar resistor 600, however, in a physical implementation the resistor will generally extend in a direction perpendicular to the plane, i.e. in effect, into the page of FIG. 6. For example, the resistor 650 may be provided as a surface-mounted resistor which forms a via from the plane of the strip pattern 610A, 610B, 620 to the (parallel) ground plane, typically through one or more layers of substrate, etc.

The resistor 650 acts as a form of damping for the resonator 600, in that the resistor 650 acts a shunt to ground, diverting at least a portion of the current flow (signal) to ground. Accordingly, the resistor (shunt) 650 attenuates the signal and hence dampens the resonator 600. The increased damping broadens the width but reduces the height of the resonance curve, and so decreases the Q-factor for the resonator 600. (One way of looking at this is that the resonator 650 increases the loss rate of the resonator 600, and so increases the denominator of the Q-factor, as defined above, which reduces the overall value of the Q-factor).

One benefit of increasing the energy absorption within a filter including resonator 600 with resistor 650 is that this can help to reduce a reflected signal. It will be appreciated that lossy synthesis, as described above, also helps to reduce a reflected signal, however, there are significant differences between the present approach, such as illustrated by resonator 600, and conventional lossy synthesis. Thus in the latter approach, the resistors are used to provide connections between the input and/or output terminals of different resonators. In contrast, for the former, i.e. the present approach, one end of resistor 650 is connected to ground, while the other end of the resistor 650 is connected internally within the resonator 600 itself (rather than at an input or output terminal 631, 632).

The resistor 650 is shown in FIG. 6 connecting to the midpoint of the channel strip 620, i.e. at the virtual ground 635, but there is considerable flexibility in the location of this connection between the resistor 650 and the hairpin resonator. Nevertheless, forming the connection approximately in a central region of the hairpin resonator, e.g. within the channel 620, is generally most useful for forming a passband filter with desired properties, as described herein.

The present approach allows for a relatively straightforward and compact physical implementation, in that as noted above, resistor 650 may be implemented (for example) as a short via between (i) the level containing planar resonator 600, and (ii) the ground plane, as would be provided for a typical circuit board implementation of a filter including resonator 600. These benefits are to be contrasted with the use of lossy synthesis, which generally results in a more complex and less compact physical implementation.

Figure 7:
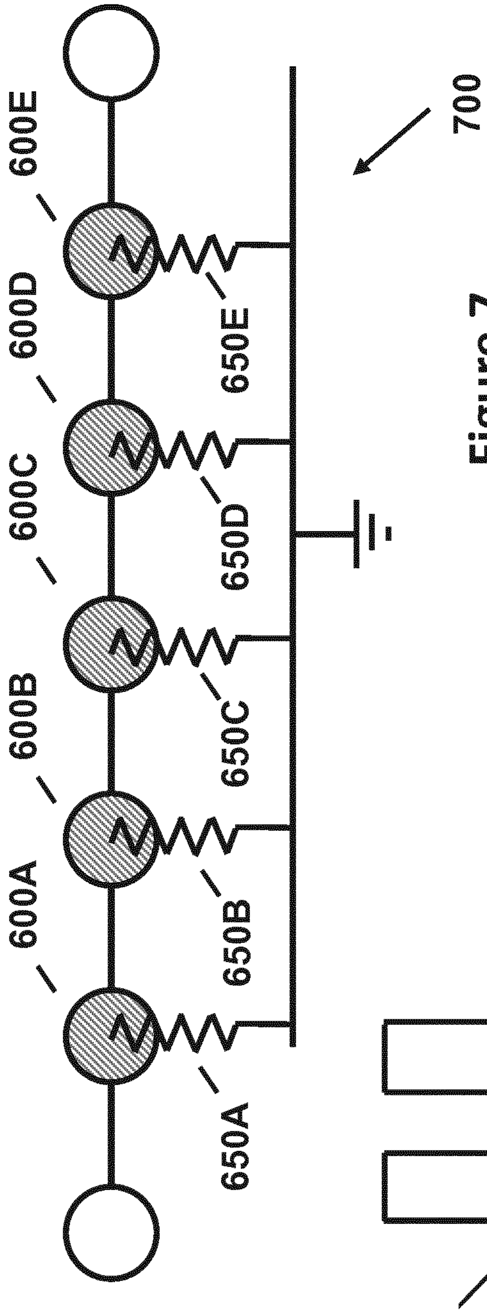
FIG. 7 is a schematic diagram of an example of a radio frequency pass-band filter, the filter including a configuration or network of resonators such as shown in FIG. 6, and being suitable for use, for example, as an intermediate filter in the radio communications system shown in FIG. 5, according to one or more embodiments shown and described herein.

FIG. 7 is a schematic diagram of an example of a radio frequency pass-band filter 700 in accordance with the present disclosure, the filter including a configuration or network of resonators 600A, 600B, 600C, 600D, 600E such as shown in FIG. 6, and suitable for use, for example, as an intermediate filter 570 in the radio communications system shown in FIG. 5. Each resonator 600A . . . 600E is provided with a respective resistor 650A, 650B, 650C, 650D, 650E to shunt the respective resonator to ground, as described above in relation to FIG. 6.

Note that although FIG. 7 shows each resonator 600A-600E as having a respective resistor 650A . . . 650E acting as a shunt to ground, in some implementations only a subset of the resonators may be provided with a respective resistor to ground; the remaining resonators, not in the subset, would therefore be generally conventional, such as might be used in a passband filter based on predistortion. For example, an implementation of filter 700 might have only the first, third and fourth resonators (600A, 600C and 600D) provided with respective resistors (650A, 650C and 650D), or any other suitable combination or selection. Conversely, while one or more resonators in a passband filter might not be shunted to ground by a resistor, it is also (or alternatively) possible that one or more resonators in a passband filter might be shunted to ground by two or more resistors, for example, channel strip 620 might be connected to the ground plane by two separate resistive vias.

Figure 1:
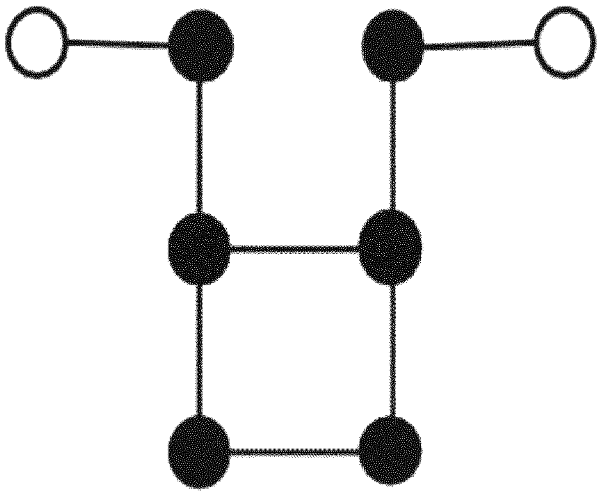
FIG. 1 is a schematic representation of a network or configuration of resonators used to form a filter.
Figure 3:
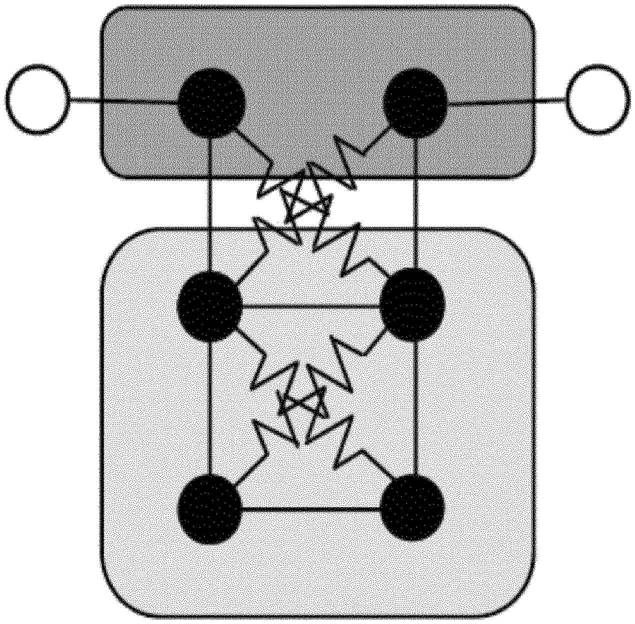
FIG. 3 is a schematic representation of a network or configuration of resonators used to form a filter as per FIG. 1, but with the addition of resistive (lossy) cross-coupling.

Furthermore, in the example of FIG. 7, the filter 700 has the resonators 600A . . . 600E configured in a series arrangement (a linear sequence), however, other filters may have a different number and/or pattern/network of resonators. For example, a radio frequency pass-band filter 700 as described herein might have the configuration (and connectivity) of the resonators shown in FIG. 1 (with at least some of those resonators being provided with a respective resistor).

The resonators 600A . . . 600E in FIG. 7 have a close physical proximity to one another so they are electromagnetically coupled together, such that the behaviour of each individual resonator is modified by the presence of the other resonators in the filter 700. In other words, the transfer function of the filter 700 as a whole does not equal the individual transfer function of each of the resonators 600A . . . 600E applied sequentially in turn (in the order of the series), but rather in effect provides a single integrated or overall transfer function representing the complete set of resonators (and resistors) shown in FIG. 7, taken as a whole.

A filter 700 such as shown in FIG. 7 can be designed using industry standard modelling and simulation tools, such as Sonnet's suites of high-frequency electromagnetic software (often referred to as Sonnet EM)—see http://www.sonnet-software.com/products/sonnet-suites/; the ANSYS HFSS 3D electromagnetic simulation software—see https://www.ansys.com/en-qb/products/electronics/ansys-hfss; Computer Simulation Technology (CST) MICROWAVE STUDIO—see https://www.cst.com/products/cstmws; and the Advanced Design System (ADS) electronic design automation software from Keysight; or any other suitable tool available to the skilled person.

In a first phase of design, such a modelling tool can be used to select resonators (frequency, Q-factor and configuration) to approximate the desired design characteristics of a filter to be created, for example in terms of the lower and upper passband frequencies, any limitations regarding insertion loss, and so on. In a second phase of design, the resistors may be added into the simulation or model, for example, to reduce the level of any reflected signal to specified limits etc.

Figure 8:
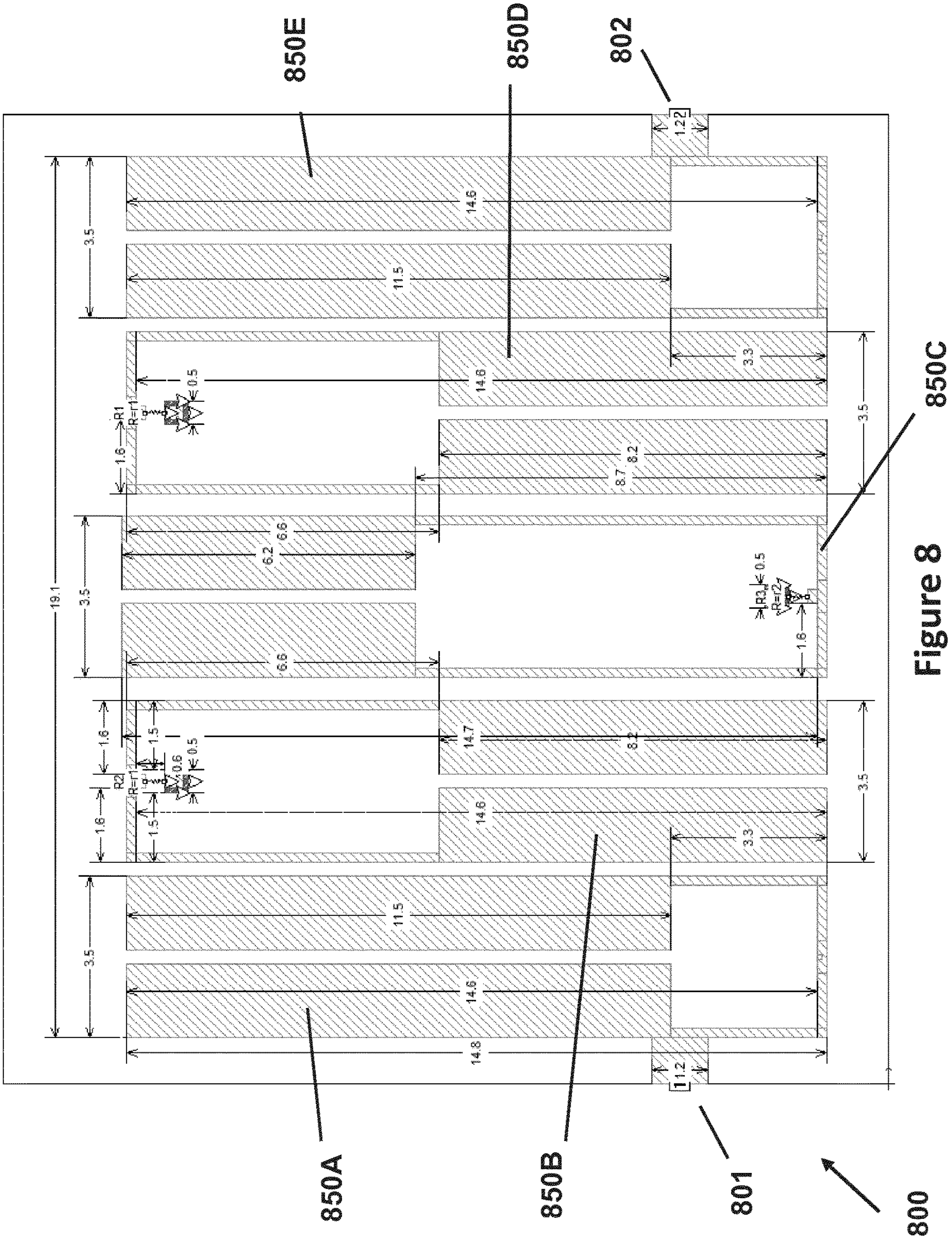
FIG. 8 is a schematic diagram showing an example of a planar microwave passband filter (hence FIG. 8 can be considered as a physical implementation of the schematic filter of FIG. 7, but without the resistive loading for the two outermost resonators), according to one or more embodiments shown and described herein.

FIG. 8 is a schematic diagram showing an example of a planar microwave passband filter 800 in accordance with the present approach. The filter of FIG. 8 is formed from an array of open-loop (hairpin) resonators in a non-transverse topology. In particular, the array of FIG. 8 comprises a linear sequence of five resonators, the middle three resonators each being centrally loaded with a resistor, while the outer two resonators do not have such a resistor. With proper selection of the loading resistors, the passband flatness can be improved very effectively (compared with the same array without such loading resistors). Overall, the proposed design of FIG. 8 has five resonators with an average unloaded quality factor (Qu) of 100, while the associated filter response shape (see FIG. 10 below) is equivalent to that of a conventional 5-pole Chebyshev filter with a uniform Qu of 600.

The filter 800 of FIG. 8 includes an input terminal 801 and an output terminal 802, with a sequence of five half-wavelength resonators 860A, 860B, 860C, 860D and 860E located between the input and output. These resonators are generally analogous to resonator 600 as shown in FIG. 6 (allowing for the fact that outer resonators 860A and 860B do not have a shunt resistor, as noted above), and are co-aligned with one another. In other words, the longitudinal axes of all the resonators are coaligned, perpendicular to the general signal flow direction from the input terminal 801 to the output terminal 802. The resonators are alternately orientated, i.e. the channel portion (the base of the U) is located at the bottom for resonators 860A, 860C and 860E and at the top for resonators 860B and 860D (it will be appreciated that top/bottom refer here to location on the page, rather than representing or limiting the final orientation of filter 800 in any given implementation).

The physical dimensions of filter 800 are provided (by way of example) in FIG. 8. Each resonator has a height of 14.8 mm (in the longitudinal direction) and a width of 3.5 mm (in the direction parallel to the axis from the input terminal 801 to the output terminal 802). The resonators are finely spaced with a separation of the order of 0.2-0.3 mm—which is much smaller than the width of an individual resonator, and also much smaller than the width of each of the two parallel conductive strips forming (part of) the resonator (analogous to strips 610A and 610B in FIG. 6). It will be appreciated that this very close spacing provides electromagnetic interaction (coupling) between adjacent resonators, such that the filter 800 is simulated at the complete level of the overall filter comprising multiple resonators.

It can be seen that the shape of each resonator 860A-E in FIG. 8A is slightly different from the shape of resonator 600 in FIG. 6, in that the two parallel conductive strips, analogous to strips 610A and 610B in FIG. 6, are thinned at the base of each resonator (corresponding to channel 620 in FIG. 6), such that the thinned width of the longitudinal conductive strips is comparable to the width of the channel at the base. Moreover, this thinning is performed in effect by removing the inner portion of the each conductive strip, thereby forming a small cavity at the base of each resonator, defined by the two thinned portions of the opposing conductive strips and the channel.

One motivation for this configuration is to slightly increase the path length through the resonator, thereby allowing for a more compact implementation for a given signal frequency. In particular, the path length through each resonator is approximately (14.8×2)+3.5=33.1 mm, corresponding to a half-wavelength (λ/2). The example filter of FIG. 8 is designed with substrate material having a dielectric constant (relative permittivity) of $\varepsilon_R$=10.2. The resonant frequency of the resonator can be approximated by: $f \approx (c/\sqrt{\varepsilon_{re}})/\lambda \approx 1$ GHz, where $\varepsilon_{re}$ is the effective relative permittivity in the microstrip, which is typically somewhat smaller than $\varepsilon_R$ ($\varepsilon_{re}$ is sometimes denoted as $\varepsilon_{eff}$ to indicate that it is the effective permittivity). The filter 800 shown in FIG. 8 has an overall footprint of 19.1 mm by 14.8 mm, plus a depth of 1.27 mm, which provides (inter alia) a separation between the resonator layer and the ground plane. It will be appreciated that this is a very compact implementation, which is of particular importance for certain applications, such as use in a handheld or otherwise portable device, and also for use in a spacecraft.

Figure 9:
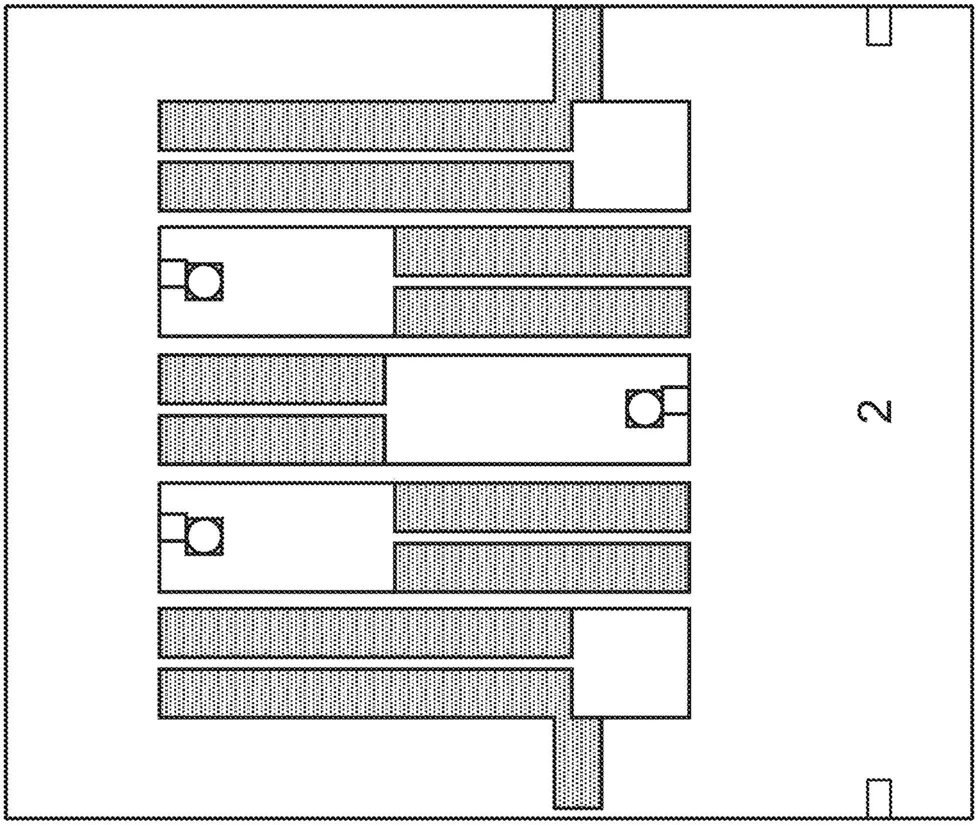
FIG. 9 is a photograph of a prototype physical implementation of the filter of FIG. 8, according to one or more embodiments shown and described herein.

The resistors used to shunt resonators 860B, 860C and 860D are shown schematically in FIG. 8, and each resistor has a resistance of approximately 100 Ohms. It has been found that the filter characteristics arising from the presence of the resistors are relatively insensitive to the exact positioning and resistance value of the resistors. This in turn provides greater manufacturing tolerance, which can help to reduce costs. The resistors in FIG. 8 may be formed, for example, as vias, as discussed above. FIG. 9 is a photograph of a prototype physical implementation of the filter of FIG. 8, showing the copper-colored printed metallization 900 and the white dielectric 902.

Figure 2:
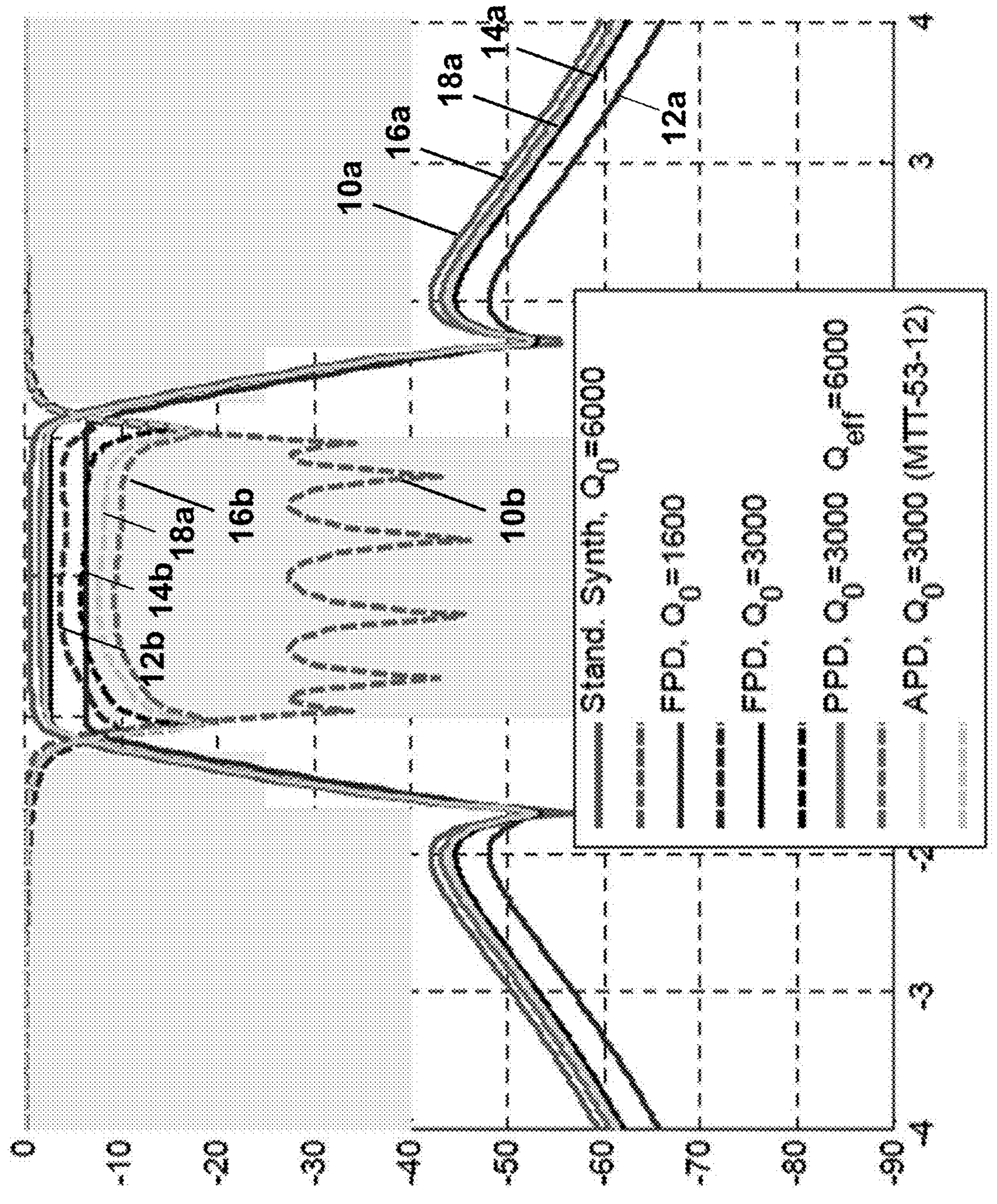
FIG. 2 is a graph of signal strength (transmission) against frequency showing simulated results for a number of implementations of the filter shown in FIG. 1, including lossless synthesis and various forms of predistortion.
Figure 4:
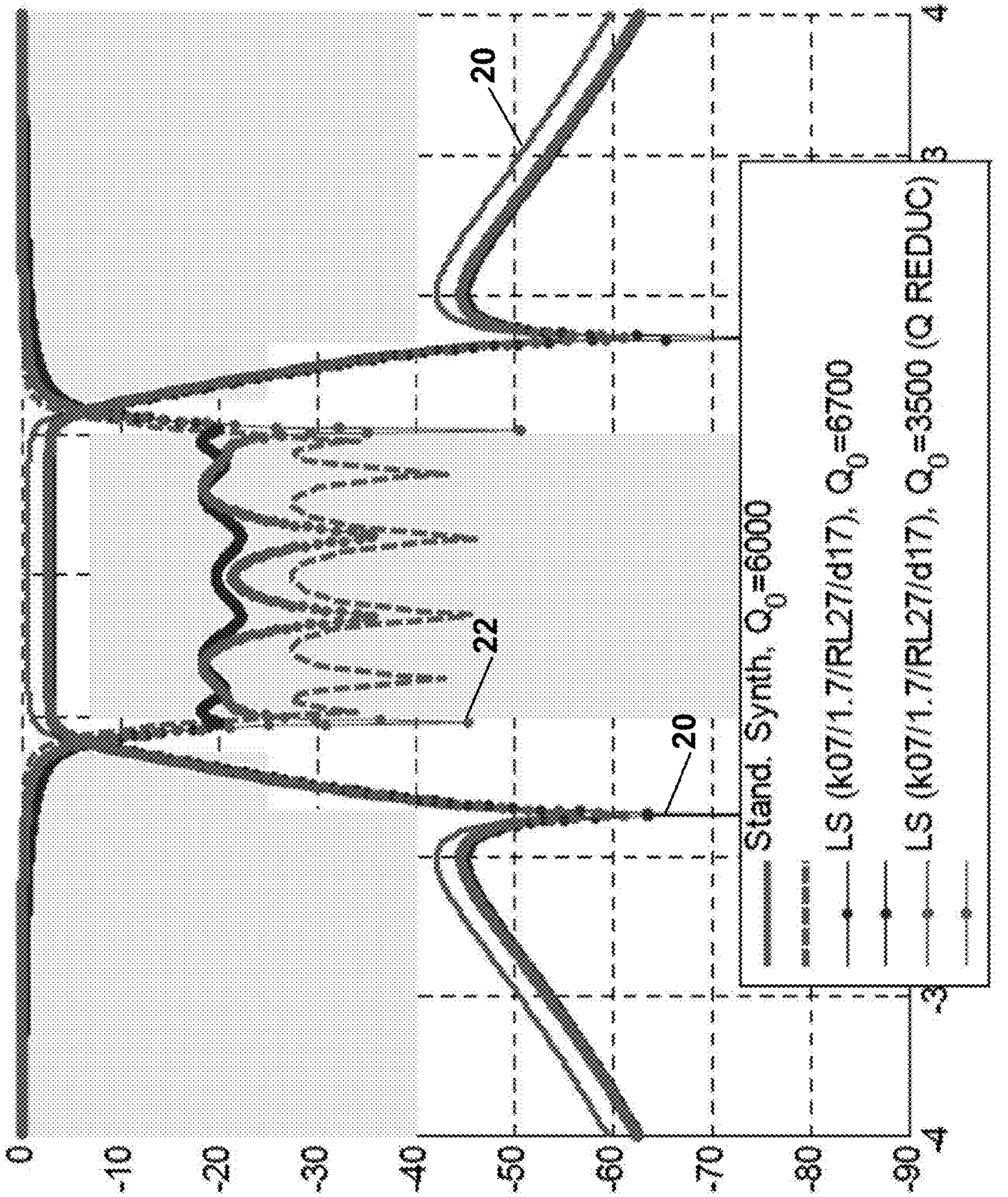
FIG. 4 is a graph of signal strength (transmission) against frequency showing simulated results for a number of implementations of the filter shown in FIG. 1, in particular based on lossless synthesis and two forms of lossy synthesis.
Figure 10:
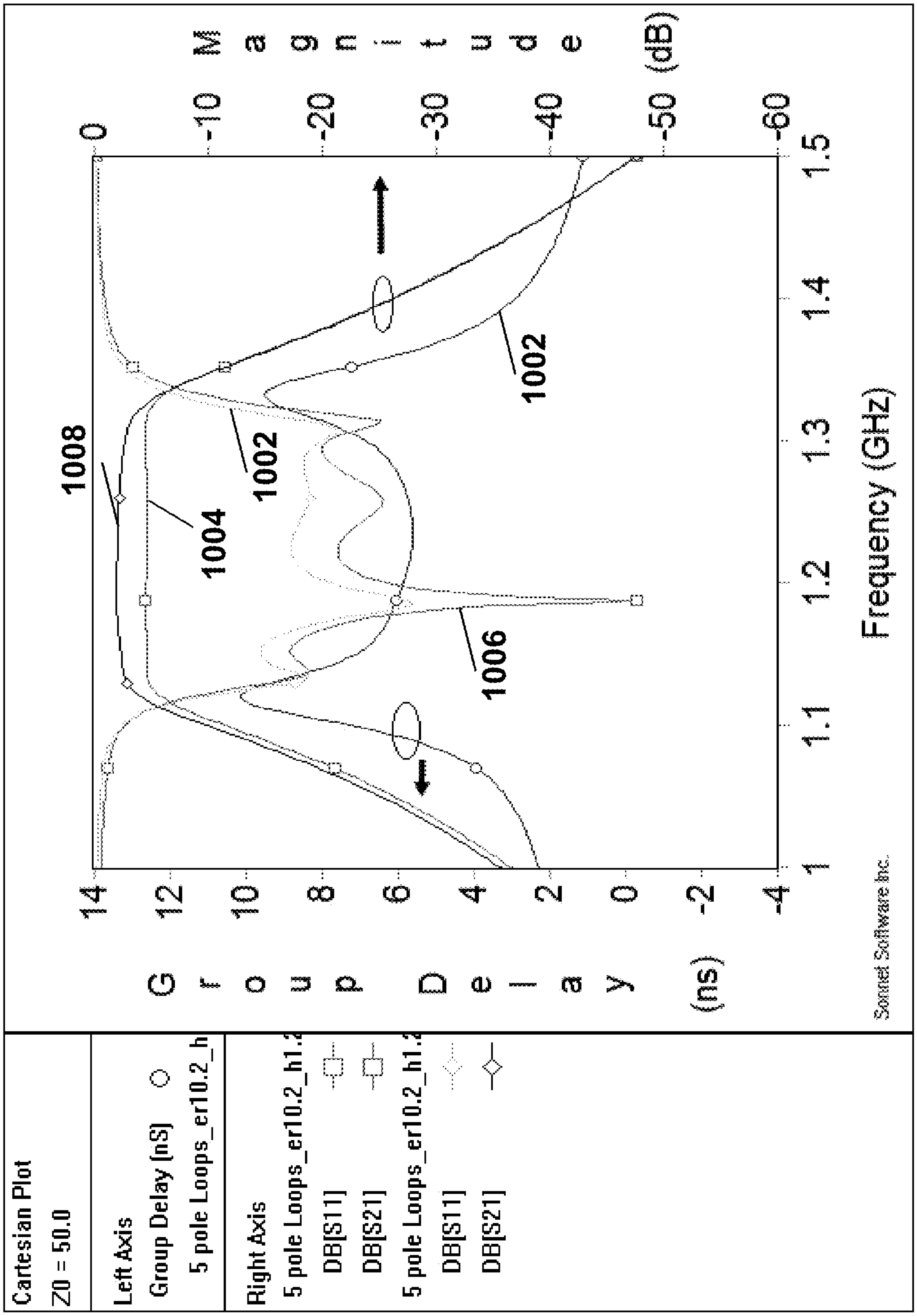
FIG. 10 is a graph of signal strength (transmission) against frequency showing simulated results for the filter of FIG. 8, both with and without central loading, according to one or more embodiments shown and described herein.

FIG. 10 is a similar plot to FIGS. 2 and 4, and shows simulation results for the filter of FIG. 8 (i) for the resistors on the three middle resonators set to 100 Ohms, and (ii) for the resistors on the three middle resonators set to an infinite value—in effect representing an open circuit, i.e. without the loading resistors. In addition, FIG. 10 shows the group delay (blue line circles (line 1002)) through the filter of FIG. 8; the group delay is relatively unaffected by the provision of the central resistance loading. The simulation used for FIG. 10 assumes a dielectric loss (tan δ=0.0023), as well as losses in the printed metallization used to create the conductive strips of the resonators—these losses are based on the use of copper for the conductive strips, with a conductivity of: $\sigma=5.8\times10^{7}$ S/m. (The dielectric relates to the substrate located around (and beneath) the printed metallization.

For each implementation, two lines are shown, namely the transmission loss DB[S21], i.e. the output signal from terminal 2 (802) arising from an input signal to terminal 1 (801), and DB[S11], i.e. the output (reflected) signal from terminal 1 (801) arising from the input signal to terminal 1 (801). The results for the centrally loaded implementation are shown by lines marked with squares (orange line 1004 for transmission, pink line 1006 for reflection), while the results without the central loading are shown by lines marked with squares (black line 1008 for transmission, light blue line 1010 for reflection).

It can be seen from FIG. 10 that including the central loading resistors slightly increases the insertion loss (as would be expected, due to the resistors absorbing energy), but also provides a flatter response across the transmission passband, with a variation of around 0.3 dB covering the whole passband. In addition, the central loading can be seen to reduce the level of the reflected signal.

Figure 11:
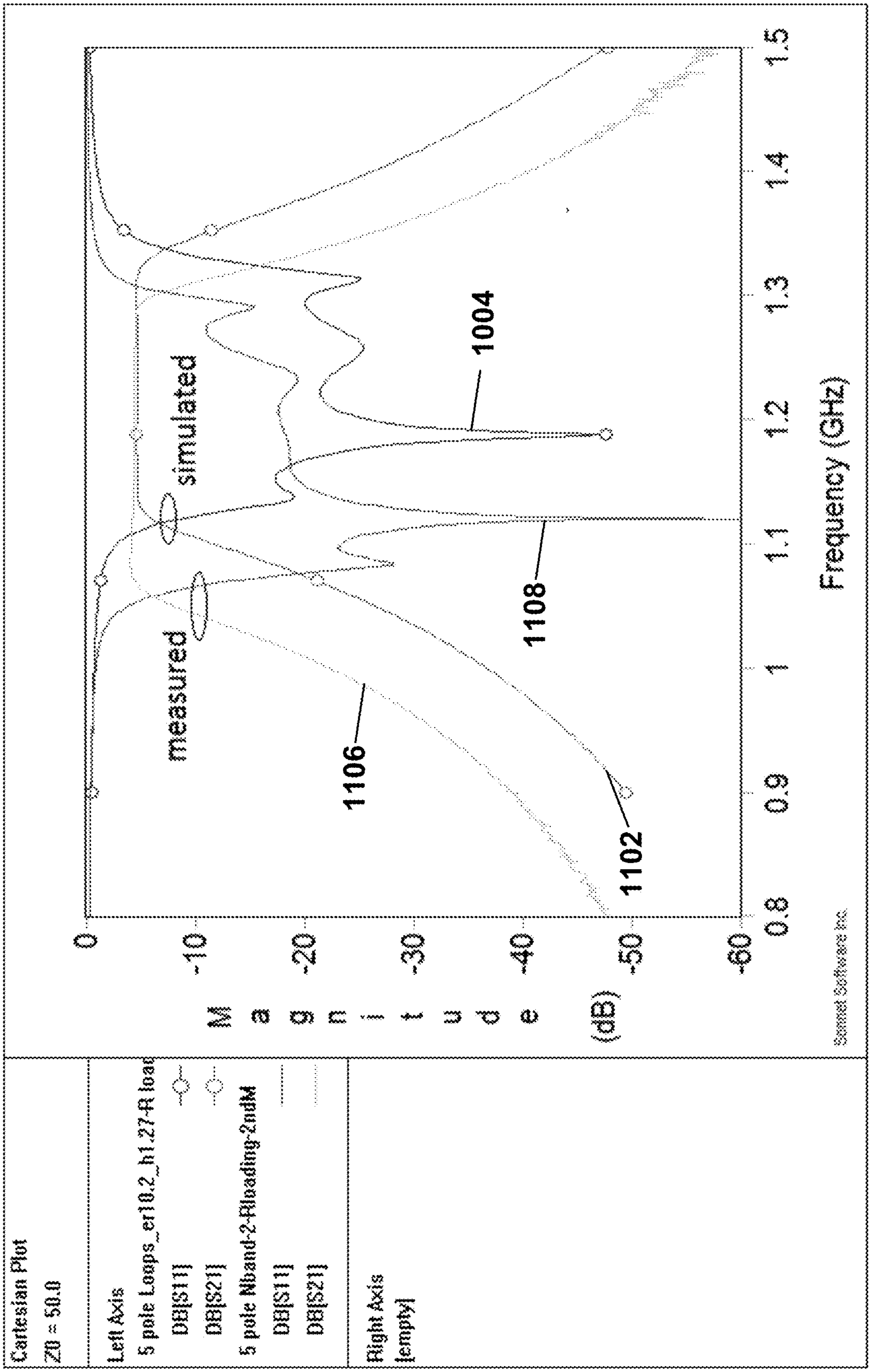
FIG. 11 is a graph of signal strength (transmission) against frequency comparing simulated results for the filter of FIG. 8 (with central loading) with measured results obtained from the prototype shown in FIG. 9; according to one or more embodiments shown and described herein.

FIG. 11 is a graph of signal strength (insertion loss) against frequency comparing the simulated results for the filter of FIG. 8 (with central loading) with measured results obtained from the prototype shown in FIG. 9. In particular, FIG. 11 shows two pairs of lines, each pair comprising one line showing the transmitted signal (DB[S12]) and another line showing the reflected signal (DB[S11)]. The first pair shows the simulated results for the transmitted signal (pink line 1102 with circles) and for the reflected signal (blue line 1104 with circles) for the modelled filter shown in FIG. 8 with central loading of the middle three resonators (these simulation results are also shown in FIG. 10). The second pair shows the measured results for the transmitted signal (green line 1106) and for the reflected signal (orange line 1108) for the prototype filter shown in FIG. 9, which is a physical implementation of the modelled filter shown in FIG. 8. It can be seen that there is a close match between the measured results and the simulated results for both (i) the absolute insertion loss and (ii) the frequency variation of the insertion loss across the passband.

Figure 12A:
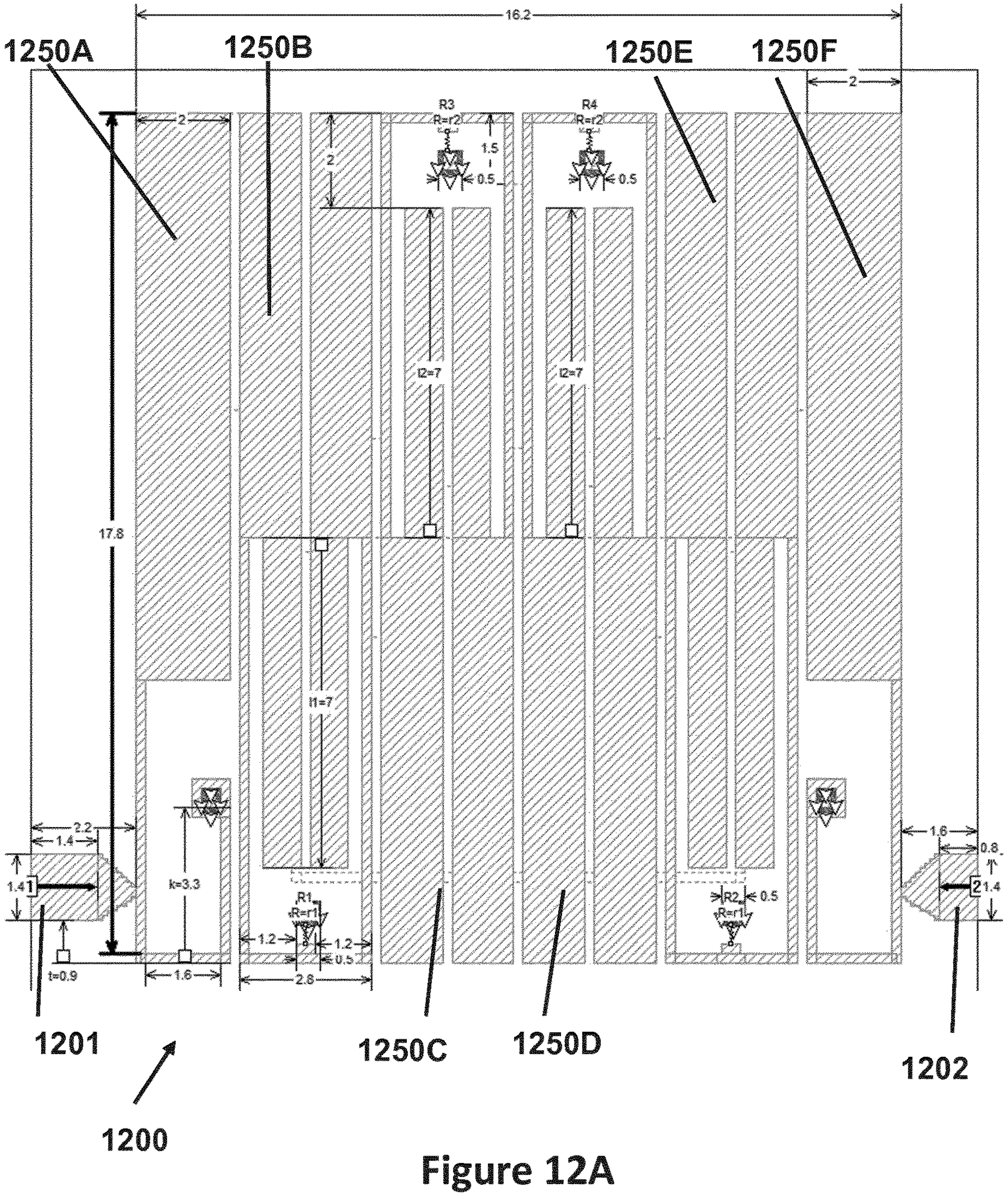
FIG. 12A depicts a plan (top) view of components of a planar microwave passband filter, according to one or more embodiments shown and described herein.
Figure 12B:
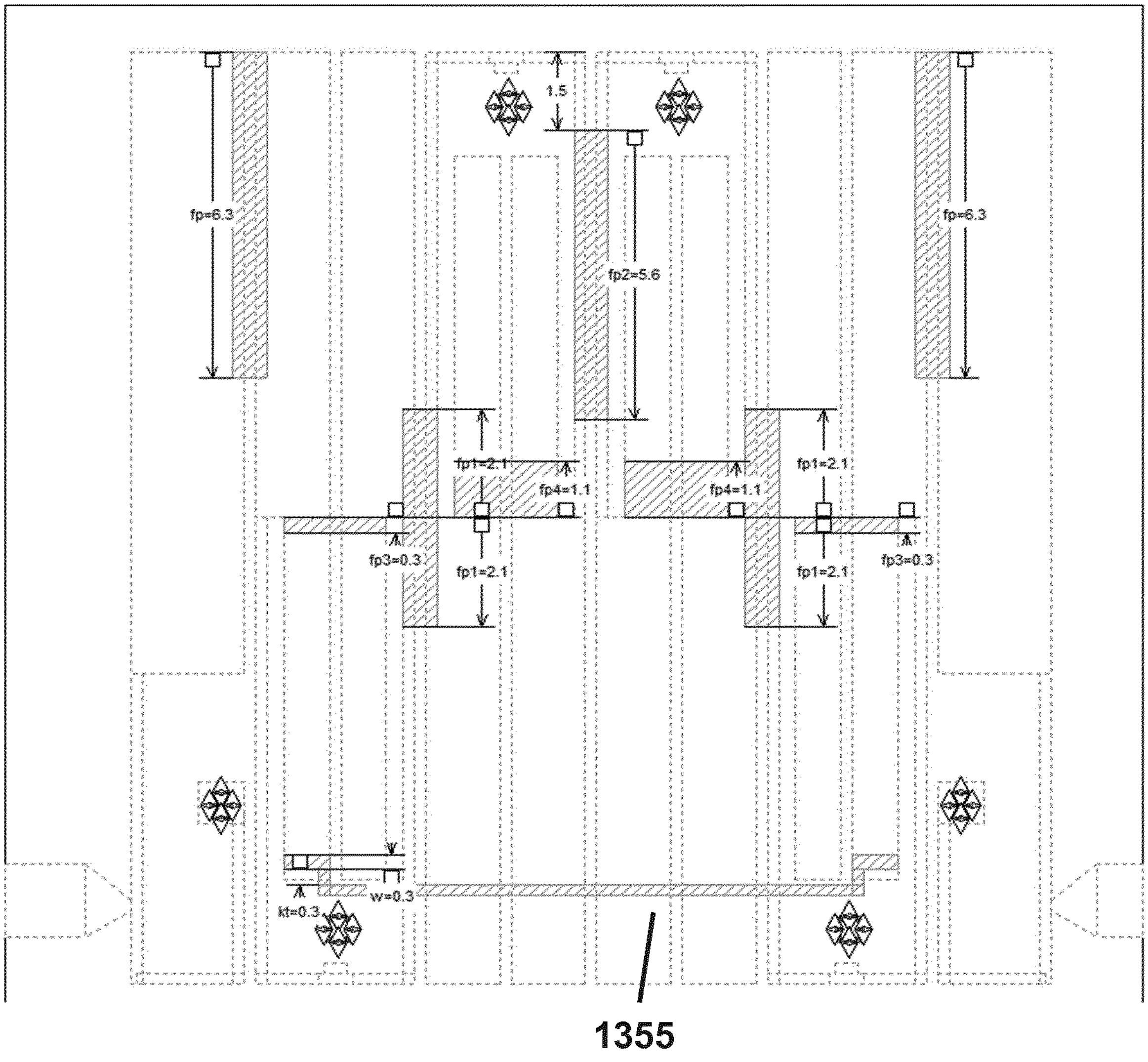
FIG. 12B depicts a middle layer of the filter of FIG. 12A, according to one or more embodiments shown and described herein.
Figure 12C:
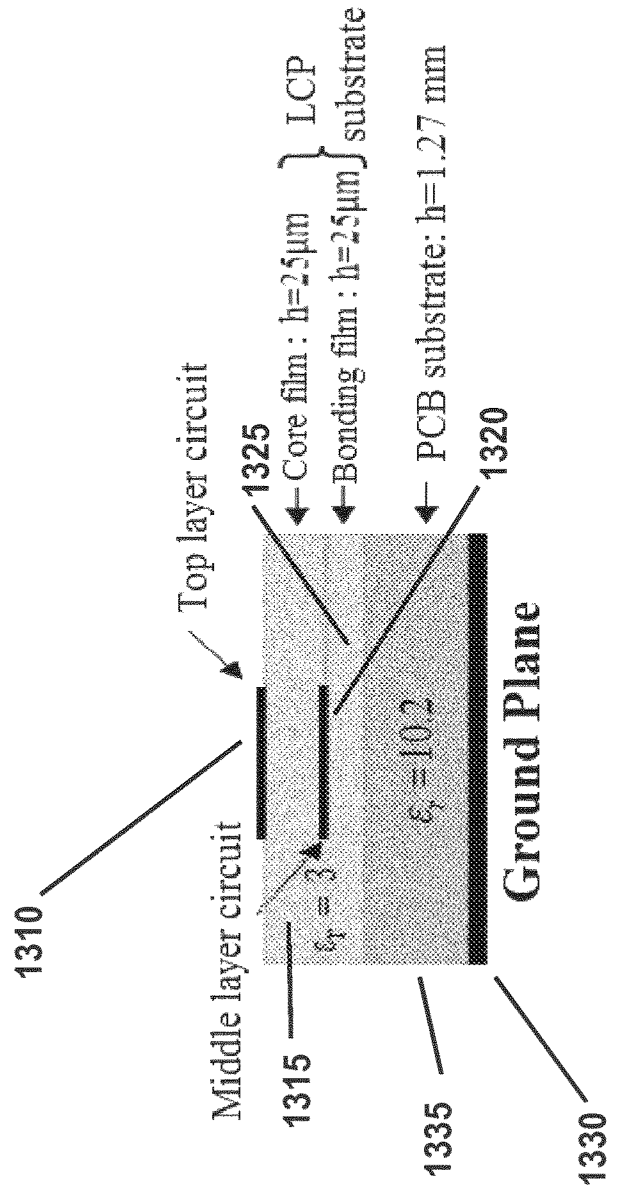
FIG. 12C depicts a transverse (cross-sectional) view of a resistor or shunt in the filter of FIG. 12A, according to one or more embodiments shown and described herein.

FIGS. 12A-12C depict another example of a filter 1200 in accordance with the present approach. FIG. 12A depicts a plan (top) view of the components of filter 1200; FIG. 12B depicts a middle layer of filter 1200; and FIG. 12C depicts a transverse (cross-sectional) view of a resistor or shunt used to centrally load some of the resonators within filter 1200. The filter 1200 has a number of differences from the filter 800 of FIG. 8 to offer a better understanding of possible variations on the approach described herein. However, it will be appreciated that the examples of FIGS. 8 and 12 are by no means limiting, and many further potential variations will be apparent to the skilled person.

The filter 1200 comprises a compact array of 6 resonators 1250A, 1250B, 1250C, 1250D, 1250E, 1250F plus an input terminal 1201 and an output terminal 1202. The two outer resonators 1250A and 1250F in FIG. 12A are quarter-wavelength resonators, which are used to help further reduce the size of the overall filter. The inside end of each of the quarter-wavelength resonators 1250A, 1250F is short-circuited to facilitate the required input/output couplings for the overall filter, and to improve the stopband performance (but no resistors are utilized for these two outer resonators).

The four central resonators 1250B . . . 1250E are hairpin resonators, with resonators 1250B and 1250E having their central portion (channel structure) at the bottom of filter 1200, and the two central resonators 1250C, 1250D having their central portion at the top of the filter 1200 (again, references to top and bottom are with respect to the geometry of the page, rather than implying any particular orientation for filter 1200). Each of the four central resonators 1250B . . . 1250E is centrally loaded with a resistor, denoted R1, R3, R4 and R2 respectively in FIG. 12A. In this particular implementation, R1=R2=100 Ohms, while R3=R4=150 Ohms. The central four resonators 1250B . . . 1250E each have a width of 2.8 mm, while the two outer resonators 1250A, 1250F have a width of 1.6 mm (as before, width is measured in a direction perpendicular to the longitudinal axis of the resonators, parallel to an axis generally extending from the input terminal 1201 to the output terminal 1202). As for the configuration of FIG. 8, the spacing between the resonators is narrow—smaller than the width of the resonators, and comparable to the thinnest conductive strips or channels in these resonators. For example, the spacing between the resonators in FIG. 12 is below 0.5 mm, typically in the range 0.2-0.3 mm.

The four central resonators 1250B . . . 1250E have the same pattern of conductive strips, which is different from the patterns used in FIG. 8. Thus each of the resonators again has a U-shape pattern, however each longitudinal conductive strip splits into two prongs or branches as it approaches the base or channel of the resonator. The outer branch on each side of the resonator extends to, and joins with, the base of the resonator, however the inner branch on each side of the resonator stops short of reaching the base of the resonator. It will be appreciated that the conductor patterns shown in FIGS. 8 and 12 are provided by way of example, and the skilled person will be aware of additional conductor patterns as appropriate.

The filter 1200 may be implemented using liquid crystal polymer (LCP) bonded printed circuit board (PCB) multilayer technology. As shown in FIG. 12C (which is not to scale), the multilayer technology comprises three metal layers, namely a top layer 1310, as depicted in FIG. 12A, a middle layer 1320, as depicted in FIG. 12B, and a solid ground plane 1330. The ground plane is provided on the under-side of a high dielectric PCB substrate 1335, which, for the particular example shown in FIG. 12C, has a height (thickness) of 1.27 mm, a relative permittivity of $\varepsilon_R$=10.2, and a dielectric loss of tan δ=0.0023. A core LCP film 1315, having a thickness of 25 μm, a relative permittivity of $\varepsilon_R$=3.0, and a dielectric loss of tan δ=0.0023, has a double-side etch to support the top metal layer 1310 on the top surface of the core LCP film 1315 (the one furthest from the substrate 1335 and ground plane 1330), and the middle layer 1320 on the lower surface of the core LCP film 1315. A bonding film 1325 of height (thickness) of 25 μm is then used to attach the core LCP film 1315 (with etched metallic layers 1310, 1320) to the PCB substrate 1335, the LCP bonding film 1325 being bonded directly to the top surface of the PCB substrate 1335.

The filter 1200 is provided not only with the central loading resistors R1, R2, R3 and R4, which are used to flatten the transmission loss across the passband, but also the middle layer 1320 provides a cross-coupling 1355 (see FIG. 12B) between the second and fifth resonators. This cross-coupling is used to create transmission zeros near the passband to improve the selectivity of the filter 1200. Note that this cross-coupling between the second and fifth resonators is also present in the resonator configuration shown in FIG. 1, and can be considered to introduce a more complex arrangement of resonators (beyond a simple linear sequence). In addition, as shown in FIG. 12B, the filter 1200 includes some additional conductive strips below the resonators, which are used to increase the couplings between the resonators, to help achieve a wider passband.

It can be seen that the cross-coupling resistor of FIG. 12 would have a sizing of approximately 7-8 mm, whereas the sizing of the central loading resistors is typically 1.5 mm or less (given the thickness of the printed circuit board hosting the resistors). It will be appreciated therefor that the central loading resistors are much more compact than the cross-coupling resistor, which may potentially support a simpler implementation.

Figure 13:
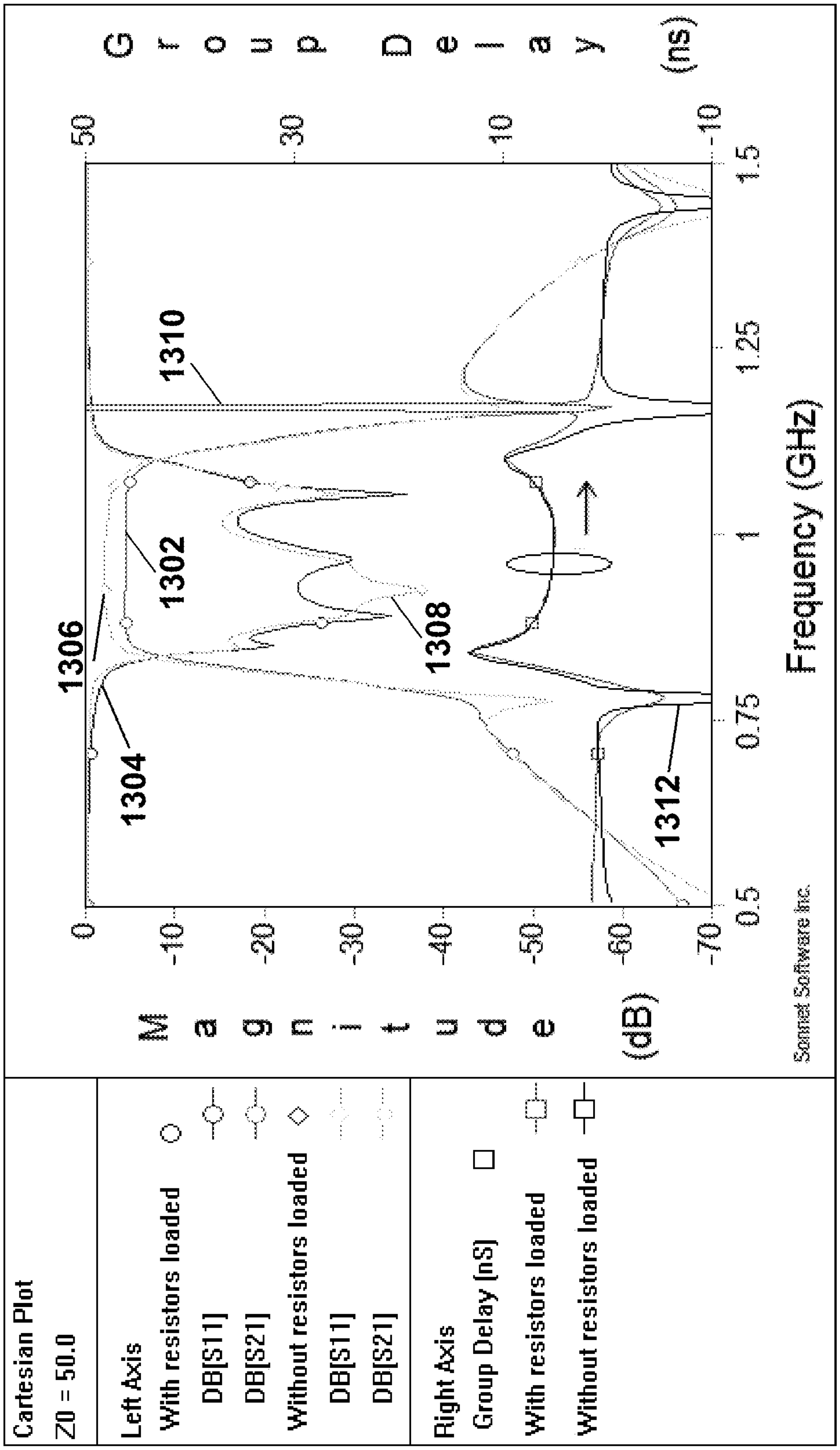
FIG. 13 is a graph of signal strength (transmission) against frequency showing simulated results for the filter of FIGS. 12A-12C, both with and without central loading, according to one or more embodiments shown and described herein.

FIG. 13 is a similar plot to FIG. 10, and shows simulation results for the filter of FIG. 12, with (i) the shunt resistors on the four middle resonators set to 100/150 Ohms, as specified above, and (ii) for the resistors on the four middle resonators set to an infinite value—in effect representing an open circuit, without the loading resistors. These simulations take into account dielectric loss (tan δ=0.0023), as well as losses in the printed copper metallization (conductivity of: $\sigma=5.8\times10^7$ S/m).

For each implementation, two lines are shown, namely DB[S21], which is the transmission loss for the output signal from terminal 1202 arising from an input signal to terminal 1201, and DB[S11], which is the output (reflected) signal from terminal 1201 arising from the input signal to terminal 1201. The results obtained for the implementation with the resistors loaded are shown by lines marked with circles (pink line 1302 for transmission, blue line 1304 for reflection), while the results obtained for the implementation without the loading resistors are shown by lines marked with diamonds (light blue line 1306 for transmission, green line 1308 for reflection).

It can be seen from FIG. 13 that including the central loading resistors slightly increases the insertion loss (as would be expected, due to the resistors absorbing energy), but also provides a significantly flatter response across the transmission passband. In addition, the central loading can be seen to reduce (slightly) the level of the reflected signal.

In addition, FIG. 13 shows simulation results for the group delay through the filter of FIG. 12. In particular, the results obtained for the implementation with the resistors loaded are shown by the orange line 1310 with squares, and the results obtained for the implementation without the resistors loaded are shown by the black line 1312 with squares. It can be seen that resistors have relatively little impact on the group delay within the passband.

Figure 14:
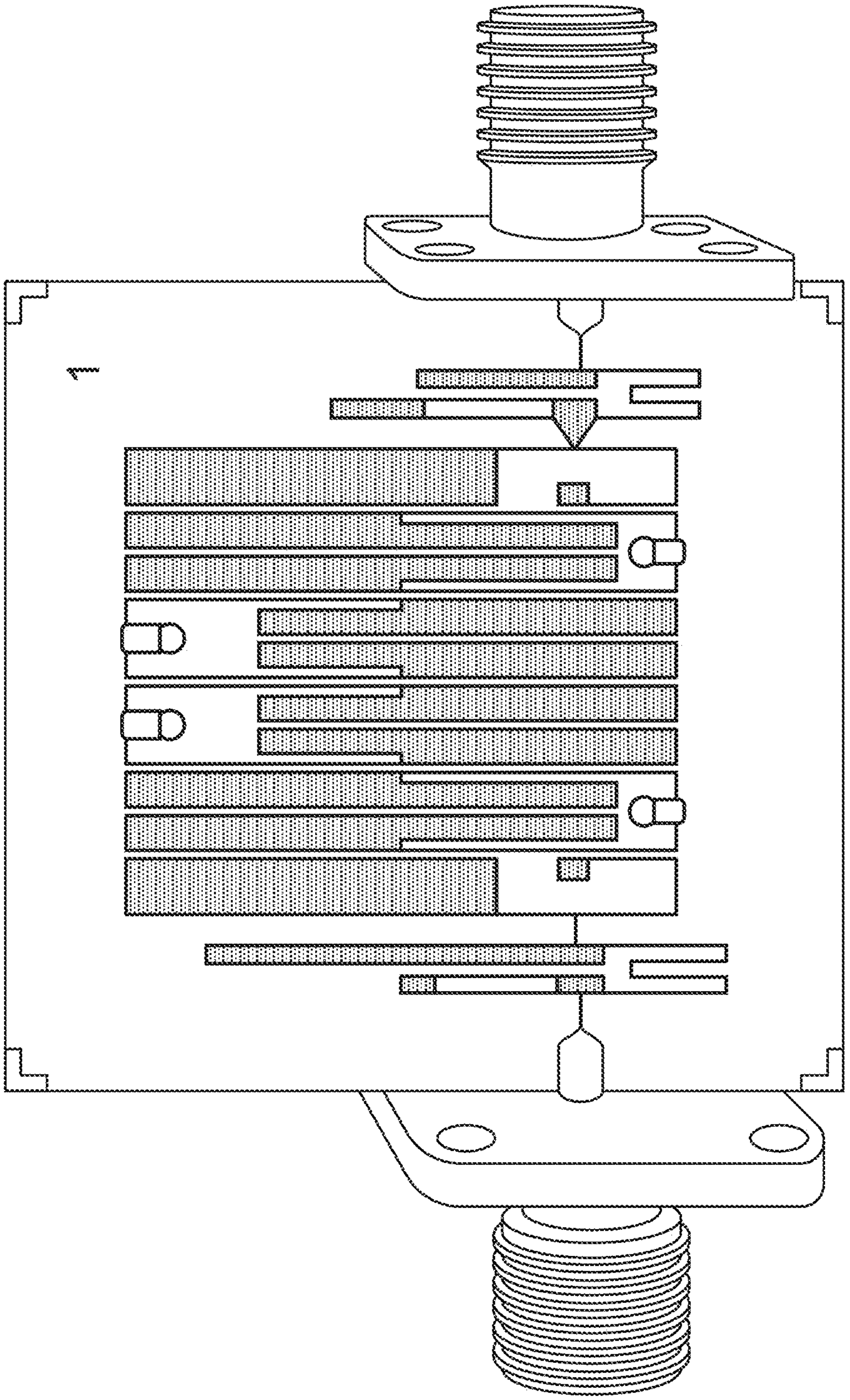
FIG. 14 is a photograph of a prototype physical implementation of a planar microwave passband filter such as schematically depicted in FIGS. 12A-12C, according to one or more embodiments shown and described herein.

FIG. 14 is a photograph of a prototype physical implementation of a planar microwave passband filter in accordance with the present approach, showing the copper-colored printed metallization 1402 and the white dielectric 1404. The filter shown in FIG. 14 has a similar structure to that shown in FIG. 12, and is again based on using LCP bonded multilayer PCB technology. The filter shown in FIG. 14 occupies a circuit size on the substrate of 24 mm by 19.6 mm (excluding the feed lines), with filter having a total thickness of 1.345 mm. The filter contains six resonators and an I/O feed structure with integrated lowpass units. Four high frequency resistors are included, two with a resistance of 150 Ohms are respectively loaded on the middle two resonators, and two with a resistance of 200 Ohms are respectively loaded on the next two adjacent resonators, i.e. the second and fifth in the sequence of six resonators.

Figure 15A:
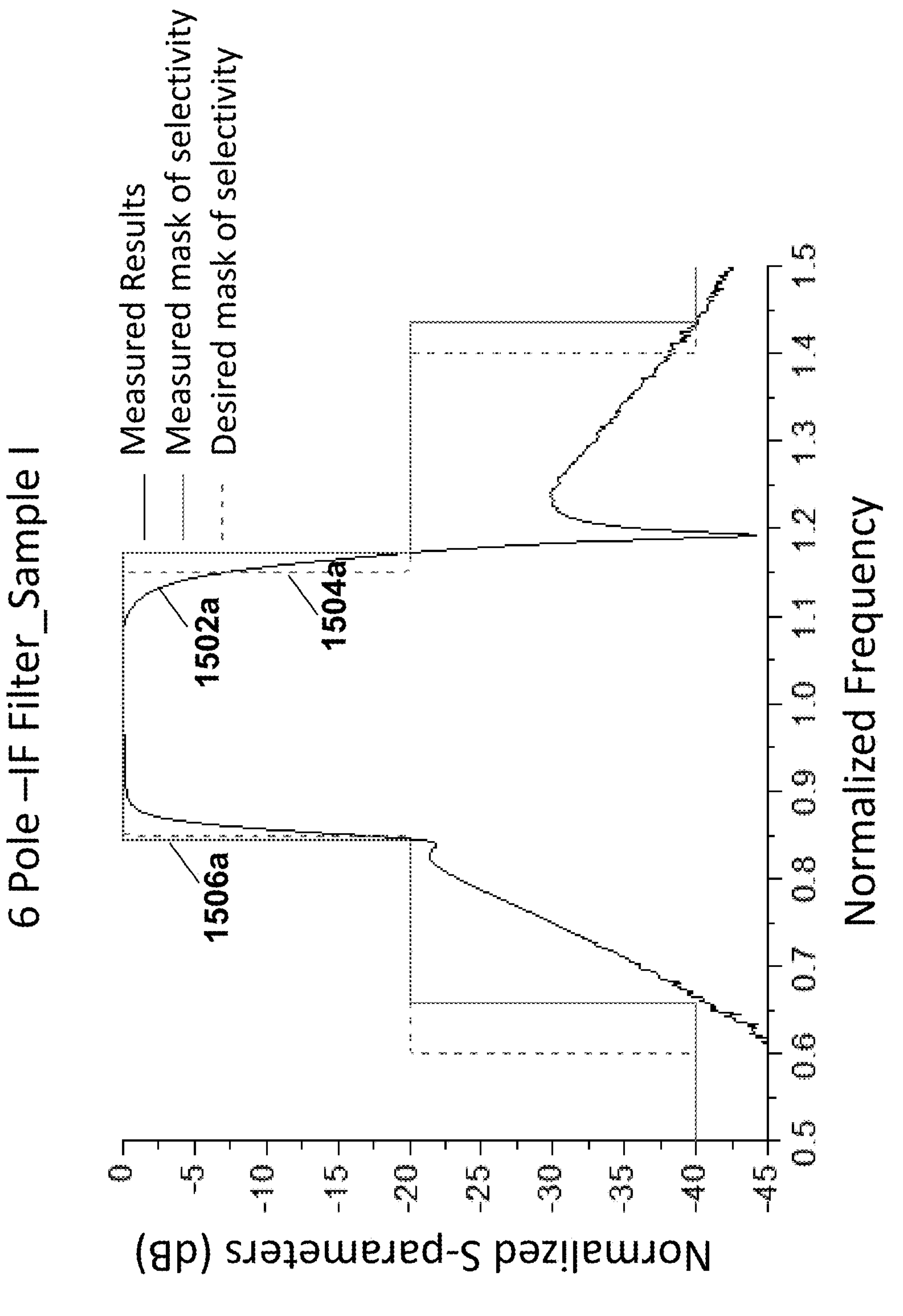
FIG. 15A provides a graph showing measured and desired results for the transmitted signal strength of the filter of FIG. 14 having an intermediate scaling, according to one or more embodiments shown and described herein.
Figure 15B:
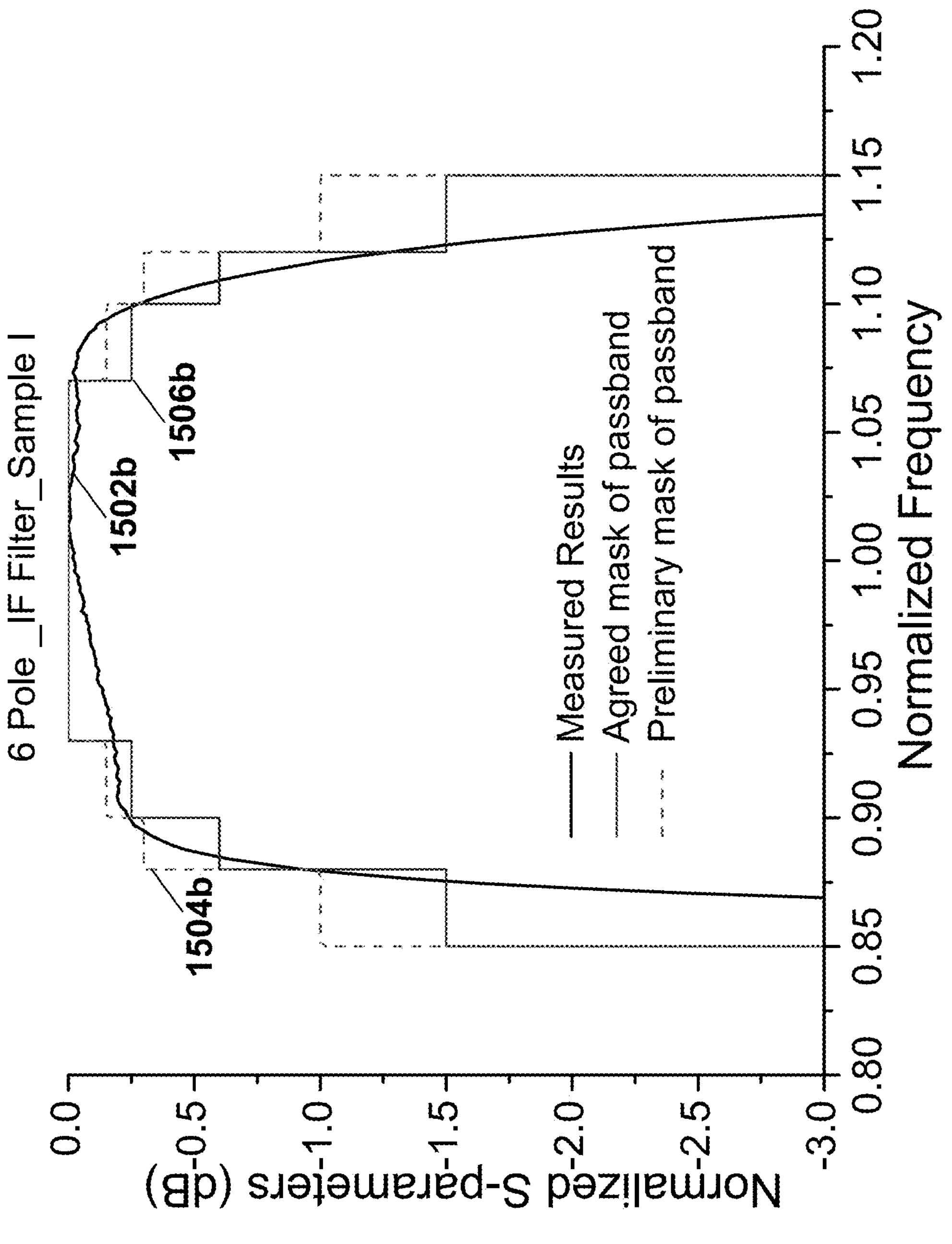
FIG. 15B provides a graph showing measured and desired results for the transmitted signal strength of the filter of FIG. 14 having an expanded scaling, according to one or more embodiments shown and described herein.
Figure 15C:
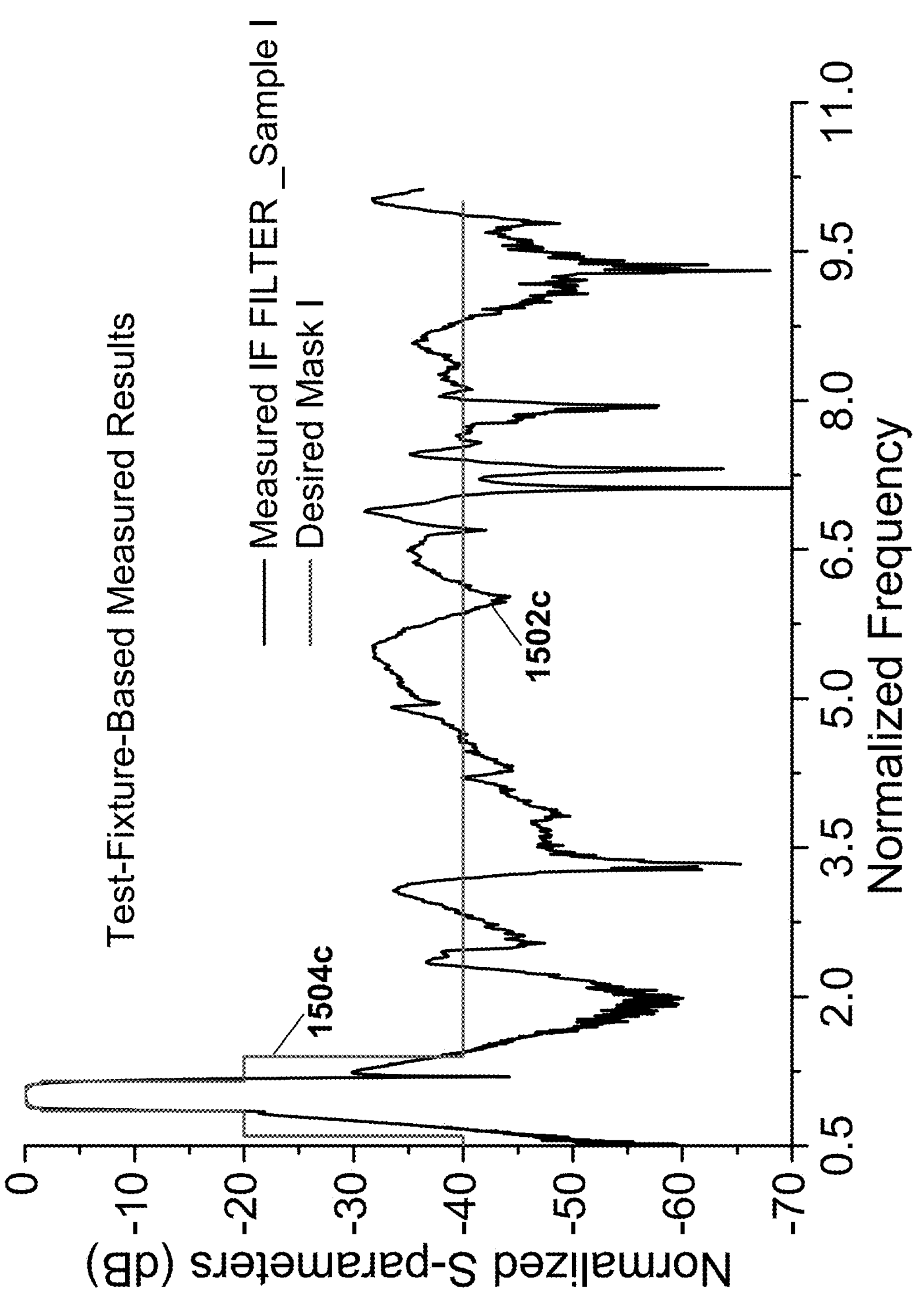
FIG. 15C provides a graph showing measured and desired results for the transmitted signal strength of the filter of FIG. 14 having a compressed scaling, according to one or more embodiments shown and described herein.

The filter shown in FIG. 14 was developed to meet stringent requirements including a flat passband, selectivity and ultra-wide stopband, as demonstrated in FIG. 15. In particular, FIGS. 15A, 15C, and 15C present graphs showing three versions of the insertion loss (alternatively referred to as the S-parameter for transmission from the input through to the output) against normalized frequency for the filter of FIG. 14 (the normalized frequency is referenced to the central frequency of the filter passband). In particular, FIG. 15A shows a first version or graph, covering a wide range of (normalized) frequency; FIG. 15B shows the same data set, but with an enlarged scale along the abscissa to focus on the passband region; and FIG. 15C shows the same data set, but with a compressed scale along the abscissa to focus on the broader stopband.

The plot of FIG. 15A has three lines: the black line 1502*a* indicating the measured response of the filter of FIG. 14; the orange dashed line 1504*a* representing a desired mask of selectivity; and the pink line 1506*a* representing the measured mask of selectivity (based on the measured response of the filter). It can be seen that the measured mask generally satisfies or is similar to (albeit not completely) the desired mask.

The plot of FIG. 15B focuses on the passband of the filter, and likewise has three lines: the black line 1502*b* indicating the measured response of the filter of FIG. 14; the orange dashed line 1504*b* representing a desired or preliminary mask for the passband; and the blue line 1506*b* representing an agreed mask of selectivity for the passband, based on the measured response of the filter. Note that the transmission of this filter is constant within about 0.25 dB for a frequency variation of approximately ±10% with regard to the central frequency of the passband.

The plot of FIG. 15C focuses on the very wide stop-band for the filter, and has two lines: the black line 1502*c* indicating the measured response of the filter of FIG. 14; and the orange line 1504*c* representing a desired mask for the filter over a wide range of frequencies, in particular those above the passband. It can be seen that the measured results generally satisfy or are similar to (albeit not completely) the desired mask across this wide frequency range.

The approach described herein supports the development of more advanced microwave planar filters that exhibit not only a flat passband, e.g. according to stringent specifications, but also other desired filtering characteristics, such as a compact size. Thus filter design is usually a tradeoff between parameters including insertion loss, variation in insertion loss and group delay across the passband, isolation (e.g. lack of a reflected or return signal), physical dimensions and mass. In some applications, the in-band absolute insertion loss is not a critical parameter; for example, in a channelizer or frequency converter, as long as the insertion loss is not excessive, it may be recoverable by the gain of a downstream low-noise amplifier without having an adverse impact on the overall system performance.

In practice, some dissipation always exists in a final filter implementation; this can be evaluated afterwards by introducing the material losses (finite Q of the resonators) into a synthesized lossless network. Among other effects, this approach may lead to filters with minimum insertion loss in the passband at one frequency, but at the expense of additional passband rounding towards the band-edges, since the use of high Q resonators is the only way to achieve filters with flat passband response using classical synthesis techniques [1]. Lossy or predistortion techniques (as described above) can help to obtain a filter that approximates an ideal frequency response (high selectivity, isolation and flat amplitude response in the passband of the filter). These techniques may not only improve filter performance, but may also reduce the size and mass of the physical filter, which in satellite applications is a very significant consideration. For example, heavy and large filters might be impractical in space systems, leading to a strong demand for wireless and handset components having low-cost and a small size.

The approach described herein typically provides a similar degree of in-band performance improvement as for lossy and predistortion techniques, but without the increase in reflection and with a reduced complexity compared to these other techniques. The approach described herein also typically provides good out-of-band rejection. The approach described herein is particularly relevant for planar filters which, for example, can be found in frequency converters. In addition, the miniaturization of this type of filter is important, and the present approach helps to provide a compact solution with the required level of RF performance (in-band and out-of-band). Such a filter might be used, for example, in a communication system with low frequency RF subsystems (transponders for L and S-band, frequency converters, etc.), providing reduced size, mass and/or complexity, a simple topology, and without penalization in other respects (such as no increase in return loss/reflected signal). In addition, good efficiency can be maintained, since the present approach avoids (or reduces) the use of resistive cross-couplings and/or reduced Q-factors for the resonators.

In conclusion, a variety of implementations have been described herein, but these are provided by way of example only, and many variations and modifications on such implementations will be apparent to the skilled person and fall within the scope of the present disclosure, which is defined by the appended claims and their equivalents.

The invention claimed is:

1. A radio frequency passband filter comprising a network of half-wavelength planar resonators, wherein at least one of the half-wavelength planar resonators includes a resistor shunted to ground to flatten response in the passband, and wherein different ones of the half-wavelength planar resonators have resistors with different resistance values.

2. The filter of claim 1, wherein a plurality of the half-wavelength planar resonators include a resistor shunted to ground.

3. The filter of claim 1, wherein the resistor shunted to ground comprises a via to a ground plane.

4. The filter of claim 1, wherein the resistor connects to at least one of the half-wavelength planar resonators at a virtual ground of the at least one half-wavelength planar resonators.

5. The filter of claim 1, wherein one or more of the planar resonators comprises a hairpin resonator.

6. The filter of claim 1, wherein the resistor has a resistance of between 10 and 1000 ohms.

7. The filter of claim 1, wherein the at least one of the half-wavelength resonators is centrally loaded with a resistor shunted to ground.

8. The filter of claim 7, wherein central loading comprises attaching the resistor within ±25% of a wavelength from a central point of the half-wavelength resonator.

9. The filter of claim 1, wherein the resistor is attached to a resonator downstream of an input terminal for the resonator, and upstream of an output terminal for the resonator.

10. The filter of claim 1, further comprising resistive couplings between different resonators in the network of half-wavelength planar resonators.

11. The filter of claim 1, wherein the resonators are formed from a printed metallization bonded to a substrate using a liquid crystal polymer.

12. The filter of claim 1, wherein the resistor has a length of less than 2.5 mm.

13. The filter of claim 1, wherein the resistor acts to suppress a return signal compared with a resonator that does not have such a resistor.

14. A microwave communications system including the filter of claim 1.

15. A radio frequency passband filter comprising:

a network of half-wavelength planar resonators, wherein at least one of the half-wavelength planar resonators includes a resistor shunted to ground to flatten response in the passband; and resistive couplings between different resonators in the network of half-wavelength planar resonators.

16. A radio frequency passband filter comprising a network of half-wavelength planar resonators, wherein at least one of the half-wavelength planar resonators includes a resistor shunted to ground to flatten response in the passband, and wherein the resonators are formed from a printed metallization bonded to a substrate using a liquid crystal polymer.

* * * * *